United States Patent Office 3,398,104
Patented Aug. 20, 1968

3,398,104
POLYURETHANE FOAM PREPARATION USING SILOXANE GLYCOL BRANCH COPOLYMERS
Loren A. Haluska, Midland, Mich., assignor to Dow Corning Corporation, Midland, Mich., a corporation of Michigan
No Drawing. Continuation-in-part of application Ser. No. 127,843, July 31, 1961. This application July 16, 1965, Ser. No. 472,721
18 Claims. (Cl. 260—2.5)

ABSTRACT OF THE DISCLOSURE

The preparation of polyurethane foams with novel siloxane glycol copolymers is disclosed. The use of these copolymers allows greater processing latitude than was possible heretofore and results in foams which do not exhibit the undesirable pneumatic effect.

This application is a continuation-in-part of application Ser. No. 127,843, filed July 31, 1961, and now abandoned.

This invention relates to the use of certain block copolymers of polysiloxanes and polyalkylene oxides, in which the blocks of polymer are tied together through silicon carbon bonds, in the preparation of polyurethane foams.

It is known that certain copolymers of alkylene oxides and polysiloxanes in which the siloxane blocks and the alkylene oxide blocks are tied together through SiOC linkages are useful as surfactants in the control of polyurethane foams. It is also known that certain linear copolymers of alkylene oxides and polysiloxanes in which the polymer blocks are tied together through silicon carbon bonds are useful as surfactants in the control of polyurethane foams. The latter materials have a distinct advantage over the former since they are non-hydrolyzable and hence are stable to deterioration by water or other materials containing reactive hydroxyls. This means that the latter type of surfactant can be stored under moist conditions or stored admixed with the polyethers prior to foaming.

However, the polyoxyalkylene polysiloxane copolymers which are tied together through silicon carbon bonds which have heretofore been known, suffered from the disadvantage that the one-shot flexible foams formed employing them as surfactants exhibited a so-called pneumatic effect. That is when the foam was compressed and the pressure released the foam did not immediately return to its original shape. This is very disadvantageous when the foam is to be used as a cushion. Although the pneumatic effect can be eliminated by mechanically crushing the foam so as to rupture the closed cells, this operation represents an added step in the production of polyurethane foams and hence is undesirable from a cost standpoint.

It is the primary object of this invention to provide novel copolymers which are useful as surfactants and as emulsifying agents. Another object is to provide a stable nonhydrolyzable surfactant for polyurethane foams which does not give a pneumatic effect in the foam. A further object is to provide superior surfactants for the production of polyurethane foams which exhibit excellent solubility in water and excellent stability in mixtures with polyglycols, amines and fluorocarbons. A still further object is to provide surfactants for the production of polyurethane foams which allow greater processing latitude in that they permit broader formulae deviations, wider catalyst tolerances and they help to produce a good foam over a wider physical range of manufacturing conditions. Other objects and advantages will be apparent from the following description.

This invention relates to the prepartion of polyurethane foams employing copolymers having the average structural formulae of the group (1) $R_aSi[(OSiMe_2)_n(OSiMeG)_dOSiMe_2G]_{4-a}$
(2) $GMe_2Si(OSiMe_2)_n(OSiMeG)_bOSiMe_2G$
(3) $Me_3Si(OSiMe_2)_n(OSiMeG)_cOSiMe_3$
(4) $R_aSi[(OSiMe_2)_n(OSiMeG)_cOSiMe_3]_{4-a}$ in which formulae R is a hydrocarbon radical free of aliphatic unsaturation and contains from 1 to 10 carbon atoms, Me is a methyl radical, G is a radical of the structure —D(OR″)$_m$A wherein D is an alkylene radical, R″ is composed of ethylene radicals and radicals selected from the group consisting of propylene and butylene radicals, the amount of ethylene radicals relative to the other alkylene radicals being such that the ratio of carbon atoms to oxygen atoms in the total OR″ blocks ranges from 2.3:1 to 2.8:1, m has an average value from 25 to 100, A is a radical selected from the group consisting of the OR′, —OOCR′ and

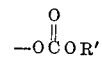

radicals wherein R′ is a radical free of aliphatic unsaturation selected from the group consisting of hydrocarbon and hydrocarbonoxy radicals, the A radical containing a total of less than eleven atoms, a has an average value of from 0 to 1, n has an average value of from 6 to 420, d has an average value of from 0 to 30, b has an average value of from 1 to 30, and c has an average value of from 3 to 30, said copolymers containing at least 13 percent by weight OSiMe$_2$ units based on the weight of the copolymer.

It should be understood that the above formulae represent the "average molecular configuration" for the products of this invention. In other words, the lengths of the dimethylsiloxy blocks and/or the oxyalkylene blocks in the copolymers are not all the same and can vary considerably provided the average value is such that n and m fall within the specified ranges. Furthermore, the silicon atoms to which the oxyalkylene blocks are attached need not be evenly spaced along the main siloxane chain.

The products of this invention are best made by reacting the omega alkenyl ether, preferably the allyl ether, of the desired polyalkylene glycol with the corresponding siloxane containing SiH groups. This reaction is best carried out by heating a mixture of the two reactants in the presence of a platinum catalyst such as platinum dispersed on an inert carrier or a compound of platinum such as chloroplatinic acid, at temperatures from 100 to 200° C. The siloxane reactants can be of four configurations; namely, (1) $R_aSi[(OSiMe_2)_n(OSiMeH)_d OSiMe_2H]_{4-a}$ (2) 
$$HMe_2Si(O\underset{\underset{H}{|}}{Si})_n(O\underset{\underset{}{|}}{Si})_b OSiH\begin{matrix}Me_2\\|\\|\end{matrix}$$

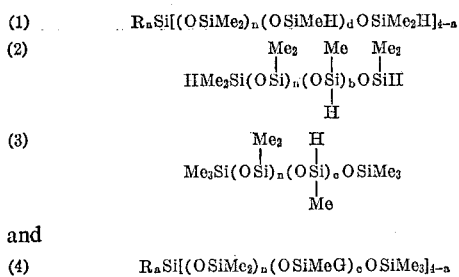

(3)
$$Me_3Si(O\underset{\underset{Me}{|}}{Si})_n(O\underset{}{Si})_e OSiMe_3\begin{matrix}Me_2 & H\end{matrix}$$

and (4) $R_aSi[(OSiMe_2)_n(OSiMeG)_e OSiMe_3]_{4-a}$

Configuration (1) is best prepared by cohydrolyzing a silane of the formula $R_aSiX_{4-a}$ with dimethyldichlorosilane, methyldichlorosilane and dimethylmonochlorosilane and thereafter equilibrating the cohydrolyzate with an acid catalyst such as $H_2SO_4$. The silanes are employed in the proportion of one mol of $R_aSiX_{4-a}$, $n$ mols of dimethyldichlorosilane, $d$ mols of methyldichlorosilane, and at least $4-a$ mols of dimethylmonochlorosilane. Configuration (2) is best prepared by cohydrolyzing the silanes in preparation of $n$ mols of dimethyldichlorosilane, two mols of dimethylmonochlorosilane and $b$ mols of methyldichlorosilane. The hydrolyzate can then be equilibrated with $H_2SO_4$. Configuration (3) is best prepared by cohydrolyzing the silanes in the proportion of $n$ mols of dimethyldichlorosilane, two mols of trimethylmonochlorosilane and $c$ mols of methyldichlorosilane and thereafter equilibrating the cohydrolyzate as above. Configuration (4) is best prepared by cohydrolyzing one mol of a silane of the formula $R_aSiX_{4-a}$ with $n$ mols of dimethyldichlorosilane, $c$ mols of methyldichlorosilane and at least $4-a$ mols of trimethylchlorosilane and thereafter equilibrating the cohydrolyzate as above.

For the purpose of this invention, R can be any hydrocarbon radical free of aliphatic unsaturation of from 1 to 10 carbon atoms such as methyl, ethyl, hexyl, phenyl, tolyl, benzyl, xylyl, methylcyclohexyl, cyclohexyl, cyclopentyl, β-phenylpropyl, β-phenylethyl, decyl and isopropyl.

The omega-alkenylpoly glycol ethers employed in this invention can be copolymers of ethylene oxide and propylene oxide or copolymers of ethylene oxide and butylene oxide or copolymers of all three oxides. In any event, the proportions of the various alkylene groups should be such that the carbon to oxygen ratio in the alkylene glycol ether should be from 2.3:1 to 2.8:1, preferably from 2.45:1 to 2.55:1. The other ends of the polyalkyleneglycol ether should consist of the group A.

For this purpose of the invention A can be any radical of the formulae —OR', —OOCH' or $$-O\overset{O}{\underset{\|}{C}}OR'$$

in which R' can be any hydrocarbon radical free of aliphatic unsaturation such as methyl, ethyl, butyl, isopropyl, cyclohexyl, phenyl, tolyl, benzyl or zenyl or any hydrocarbonoxy radical such as $-OCH(CH_2OMe)_2$. In these radicals the total number of C and O atoms if any should not exceed 10, that is, the A radical should contain a total of less than eleven atoms.

Thus it can be seen that the polyoxyalkylene blocks of the copolymers of this invention can be blocked with ether, acyl or carbonate ester groups. These groups are best formed by capping the polyalkyleneglycol-monoomega-alkenyl ether after it is formed by any conventional procedure. Thus, for example, one may react the alkali metal salt of the monoallyl ether with an alkyl chloride to produce an OR' group or one may react the monoallyl ether with an acyl halide or acide anhydride to produce an OOCR' group or with an alkylchloroformate to produce the

group. All of these reactions are carried out by well-known procedures.

The omega alkenyl end of the omega-alkenylpoly glycol ethers can be linear or branched in configuration and can contain any number of carbon atoms. Upon addition of these ethers to the SiH compound, the alkenyl radical becomes an alkylene radical which is represented in the formulae above by the symbol D. Specific examples of D are the methylene, ethylene, propylene, isopropylene, butylene, octylene, decylene, octadecylene and myricylene radicals. Preferably D contains from 1 to 18 carbon atoms with the propylene radical derived from the allyl ether being the most preferred at this time.

The copolymers of this invention are useful in controlling the foam formation in polyurethane resins. The copolymers are operative with any type of polyurethane polymers such as those based upon polyesters and those based upon polyethers.

As is well-known, the polyurethane foams are prepared by reacting an organic isocyanate having at least two isocyanate groups per molecule with a polyether or polyester resin containing at least two hydroxyl groups per molecule. Preferably the polyesters are reaction products of aliphatic dihydric or polyhydric alcohols and aliphatic dicarboxylic acids or hydroxylated monocarboxylic acids. In these materials the hydroxyl groups can appear on the end of the chain by using an excess of the alcohol. The hydroxyl groups may also appear along the polyester chain by employing polyfunctional alcohols such as glycerin, pentaerythritol, trimethylolpropane or trimethylolethane. Also the hydroxyl groups may be in the acidic fragment of the polymer by employing hydroxylated acids or by employing glycerides or hydroxylated acids such as castor oil. For the purpose of this invention the basic composition of the polyester is not critical nor is the degree of hydroxylation.

The preferred base polymers are the hydroxylated polyethers which for the purpose of this invention can be any of those normally employed in the production of polyurethane polymers. These ethers are particularly described in U.S. Patent 2,948,691. The composition of the polyether is not critical for the purpose of this invention, although it is preferred that the material have a molecular weight of at least 500. In general, the polyethers are reaction products of alkylene oxides such as ethylene oxide, propylene oxide and butylene oxide with alcohols or water. The polyether may also contain some copolymerized polyhydric alcohol such as those described above.

For the purpose of this invention, any isocyanate having at least two isocyanate groups per molecule is suitable. These include aliphatic isocyanates such as hexamethylenediisocyanate; cycloaliphatic isocyanates such as cyclohexyl diisocyanate and aromatic isocyanates such as naphthalene 1,5-diisocyanate, toluene diisocyanate, 4,4'-diphenylmethane diisocyanate,

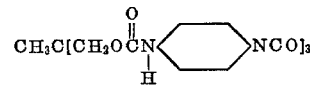

and 4,4'-diphenyl diisocyanate. If desired, the isocyanates can be employed in molar excess with respect to the OH groups in the polyether so that excess isocyanate groups provide the gas for foaming the product.

Any of the catalysts normally employed in preparing polyurethane foams are operative in this invention. These include, for example, metallic compounds such as dibutyltin dilaurate, dibutyltin diacetate or stannous octoate and amines such as triethylamine, tributylamine and triethylenediamine. Mixtures of two or more catalysts can be used if desired.

The foams of this invention can be prepared employing any blowing agent. In many foams the blowing agent is the evolved $CO_2$ which results from the reaction of the isocyanate with $H_2O$. However, in other foams it is preferable to employ volatile fluids such as methylene chloride or the fluorochloromethanes and ethanes generally sold under the name Freon. However, the process of this invention is not restricted to these types of agents. In the former case the water acts as the blowing agent for the purpose of this invention.

The precise amount of the copolymer of this invention needed to produce the optimum foam varies with the particular polyurethane formulation. However, in general, satisfactory foams are obtained employing from .1 to 2 percent by weight copolymer based on the weight of the total polyurethane foam formulation. If desired, a mixture of two or more copolymers can be used.

The following examples are illustrative only and should not be construed as limiting the invention which is properly delineated in the appended claims. In the examples and claims Me is employed as an abbreviation for the methyl radical. All viscosities and refractive indexes (RI) were measured at 25° C. unless otherwise specified.

EXAMPLE 1

130.8 g. of $$CH_2=CHCH_2O(C_2H_4O)_{22}(C_3H_6O)_{16.7}OCCH_3$$

was mixed with 204 g. of xylene, 43.2 g. of

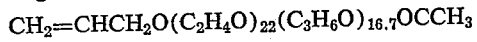

and 2 g. of 1 percent platinum dispersed on alumina and heated at 141° C. for 24 hours. The product was stripped to a temperature of 200° C. at 1.2 mm. to give a fluid water soluble material having the following properties: RI, 1.4460; viscosity, 1,368 cs. The material had the average general formula

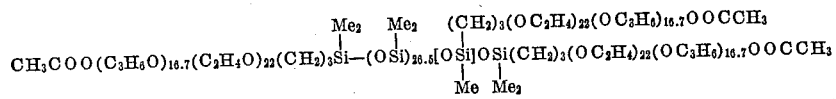

EXAMPLE 2

A mixture of 163.7 g. of $$CH_2=CHCH_2O(C_2H_4O)_{27.5}(C_3H_6O)_{20.9}OCCH_3$$

54.9 g. of

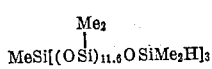

125 g. of toluene and .2 g. of 1 percent by weight platinum as chloroplatinic acid in dimethylphthalate, was heated at 122° C. for 24 hours. The product was then stripped to remove solvent and the residue had a viscosity of 2,655 cs. and a refractive index of 1.4450. This product had the average formula

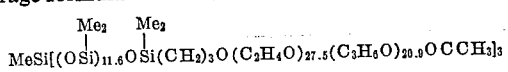

EXAMPLE 3

Employing the procedure of Example 2, 130.8 g. of $CH_2=CHCH_2(OC_2H_4)_{35.4}(OC_4H_9)_{14.4}OOCCH_3$ was reacted with 42.6 g. of

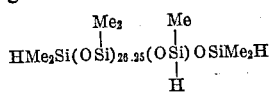

in 124 g. of xylene at 146.2° C.

The resulting product was a fluid having a viscosity of 4,405 cs. and a refractive index of 1.4490. The product had the average formula

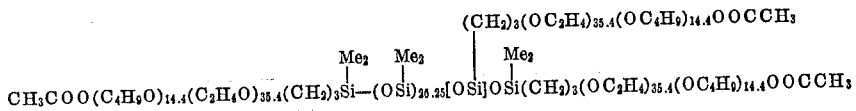

EXAMPLE 4

Employing the procedure of Example 2, 168.5 g. of $CH_2=CHCH_2(OC_2H_4)_{28.1}(OC_4H_9)_{9.24}OOCCH_3$ was reacted with 53.8 g. of

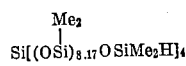

in 252.3 g. of xylene at 144° C. The resulting product had a viscosity of 1,950 cs. and a refractive index of 1.4480. The product had the average formula

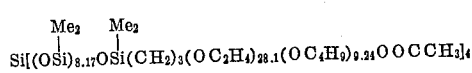

EXAMPLE 5

Employing the procedure of Example 2, 120.3 g. of $CH_2=CHCH_2(OC_2H_4)_{22.5}(OC_3H_6)_{17.1}OOCCH_3$ was reacted with 45.5 g. of

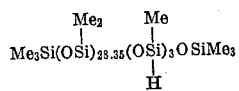

in 195.8 g. of xylene. The resulting product had a viscosity of 2,175 cs. and a refractive index of 1.4425. The product had the average general formula of

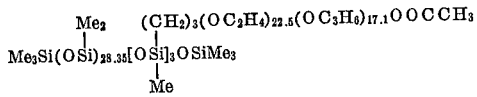

EXAMPLE 6

The products of each of the above examples was employed as a surfactant for the formation of polyurethane foams in the following formulation. There was mixed 50 parts by weight of a polypropyleneglycoltriol of 3,000 molecular weight, .7 part by weight of the surfactant, 1.7 parts by weight water, .28 part by weight dibutyltin dilaurate, and .04 part by weight triethylamine. These ingredients were thoroughly mixed and immediately thereafter 21 parts of toluene diisocyanate was added. The mixture was allowed to foam and in each case an excellent foam which showed no pneumatic tendencies was obtained.

Each of the above surfactants was water dispersible.

EXAMPLE 7

When the following polyalkylene oxides are reacted with the following siloxanes in accordance with the procedure of Example 1, the following copolymers are obtained.

| Polyalkylene oxide | Siloxane | Copolymer |
|---|---|---|
| $CH_2=CHCH_2O(C_2H_4O)_{55}(C_3H_6O)_{20}C_4H_9$ | $C_6H_5Si[(OSi)_{25}^{Me_2}OSiH]_3^{Me_2}$ | $C_6H_5Si[(OSi)_{25}^{Me_2}OSi(CH_2)_3O(C_2H_4O)_{55}^{Me_2}$ $(C_3H_6O)_{20}C_4H_9]_3$ |
| $CH_2=CHCH_2O(C_2H_4O)_{27}(OC_3H_6)_{21}-\overset{O}{\overset{\|}{C}}OC_2H_5$ | $C_{10}H_{21}Si[(OSi)_{25}^{Me_2}OSiH]_3^{Me_2}$ | $C_{10}H_{21}Si[(OSi)_{25}^{Me_2}OSi(CH_2)_3O(C_2H_4O)_{27}^{Me_2}$ $(C_3H_6O)_{21}-\overset{O}{\overset{\|}{C}}OC_2H_5]_3$ |
| $CH_2=CHCH_2O(C_2H_4O)_{27}(C_3H_6O)_{21}\overset{O}{\overset{\|}{C}}C_6H_5$ | $Me_3SiO(SiO)_{25}^{Me_2}(\underset{Me}{SiO})_4 SiMe_3^{H}$ | $Me_3SiO(SiO)_{25}^{Me_2}[\underset{Me}{SiO}]_4 SiMe_3^{(CH_2)_3O(C_2H_4O)_{27}(C_3H_6O)_{21}\overset{O}{\overset{\|}{C}}C_6H_5}$ |
| $CH_2=CHCH_2O(C_2H_4O)_{27}(C_3H_6O)_{21}\overset{O}{\overset{\|}{C}}C_8H_{17}$ | $HSi(OSi)_{25}^{Me_2 Me_2}(OSi)_2^{H} OSiH^{Me_2}$ $\phantom{HSi(OSi)_{25}Me_2 Me_2(OSi)_2}Me$ | $\overset{O}{\overset{\|}{H_{17}C_8C}}(OC_3H_6)_{21}(OC_2H_4)_{27}O(CH_2)_3Si(OSi)_{25}^{Me_2}$ $(CH_2)_3O(C_2H_4O)_{27}(C_3H_6O)_{21}OCC_8H_{17}$ $[OSi]_2O-Si(CH_2)_3(OC_2H_4)_{27}(OC_3H_6)_{21}OOCC_8H_{17}$ $\underset{Me}{} \underset{Me_2}{}$ |
| $CH_2=CHCH_2O(C_2H_4O)_{27}(C_3H_6O)_{21}CH(CH_2OMe)_2$ | $C_6H_{11}Si[(OSi)_{25}^{Me_2}OSiH]_3^{Me_2}$ | $C_6H_{11}Si[(OSi)_{25}^{Me_2}OSi(CH_2)_3O(C_2H_4O)_{27}^{Me_2}$ $(C_3H_6O)_{21}CH(CH_2OMe)_2]_3$ |
| $CH_2=CHCH_2CH_2O(C_2H_4O)_{35}(C_3H_6O)_{30}OCCH_3$ | $Si[(OSiMe_2)_{50}(OSiMeH)_5OSiMe_2H]_4$ | $Si\{(OSiMe_2)_{50}[O\underset{Me_2}{\overset{Me}{Si}}(CH_2)_4O(C_2H_4O)_{35}(C_3H_6O)_{30}$ $OCCH_3]_5OSi(CH_2)_4O(C_2H_4O)_{35}(C_3H_6O)_{30}OCCH_3\}_4$ |
| $CH_2=CHCH_2O(C_2H_4O)_{50}(C_3H_6O)_{40}OCCH_3$ | $Si[(OSiMe_2)_{125}(OSiMeH)_{15}OSiMe_2H]_4$ | $Si\{(OSiMe_2)_{125}[O\underset{Me_2}{\overset{Me}{Si}}(CH_2)_3O(C_2H_4O)_{50}(C_3H_6O)_{40}$ $OCCH_3]_{15}Si(CH_2)_3O(C_2H_4O)_{50}(C_3H_6O)_{40}OCCH_3\}_4$ |
| $CH_2=CHCH_2O(C_2H_4O)_{27}(C_3H_6O)_{21}OCCH_3$ | $C_2H_5Si[(OSiMe_2)_{250}(OSiMeH)_{25}OSiMe_2H]_3$ | $C_2H_5Si\{(OSiMe_2)_{250}[O\overset{Me}{Si}(CH_2)_3O(C_2H_4O)_{27}(C_3H_6O)_{21}$ $OCCH_3]_{25}\underset{Me_2}{Si}(CH_2)_3O(C_2H_4O)_{27}(C_3H_6O)_{21}OCCH_3\}$ |
| $CH_2=CH(CH_2)_4O(C_2H_4O)_{40}(C_3H_6O)_{40}OCCH_3$ | $HMe_2Si(OSiMe_2)_{140}(OSiMeH)_{10}OSiMe_2H$ | $CH_3CO(OC_3H_6)_{40}(OC_2H_4)_{40}O(CH_2)_6\overset{Me_2}{Si}(OSiMe_2)_{140}$ $[O\overset{Me}{Si}(CH_2)_6O(C_2H_4O)_{40}(C_3H_6O)_{40}OCCH_3]_{10}$ $O\overset{Me_2}{Si}(CH_2)_6O(C_2H_4O)_{40}(C_3H_6O)_{40}OCCH_3$ |
| $CH_2=CHO(C_2H_4O)_{60}(C_4H_9O)_{35}C_4H_9$ | $Me_3Si(OSiMe_2)_{90}(OSiMeH)_9OSiMe_3$ | $Me_3Si(OSiMe_2)_{90}[O\overset{Me}{Si}CH_2CH_2O(C_2H_4O)_{60}$ $(C_4H_9O)_{35}C_4H_9]_9OSiMe_3$ |
| $CH_2=CHCH_2O(C_2H_4O)_{15}(C_5H_6O)_{15}OCCH_3$ | $MeSi(OSiMe_2)_{65}(OSiMeH)_8OSiMe_3$ | $Me_3Si(OSiMe_2)_{65}[O\overset{Me}{Si}(CH_2)_4O(C_2H_4O)_{15}$ $(C_3H_6O)_{15}OCCH_3]_8OSiMe_3$ |
| $CH_2=CHC_{16}H_{32}O(C_2H_4O)_{38}(C_3H_6O)_{37}OCCH_3$ | $Me_3Si(OSiMe_2)_{135}(OSiMeH)_{15}OSiMe_3$ | $Me_3Si(OSiMe_2)_{135}[O\overset{Me}{Si}C_{16}H_{35}O(C_2H_4O)_{38}$ $(C_3H_6O)_{37}OCCH_3]_{15}OSiMe_3$ |
| $CH_2=CHCH_2O(C_2H_4O)_{45}(C_3H_6O)_{52}OCCH_3$ | $MeSi[(OSiMe_2)_{75}(OSiMeH)_7OSiMe_3]_3$ | $MeSi\{(OSiMe_2)_{75}[O\overset{Me}{Si}(CH_2)_3O(C_2H_4O)_{45}$ $(C_3H_6O)_{52}OCCH_3]_7OSiMe_3\}_3$ |

EXAMPLE 8

48 g. of $Me_3Si(OSiMe_2)_{75.8}(OSiMeH)_7OSiMe_3$ was mixed with 229 g. of

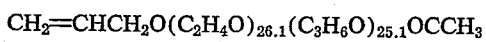

59 g. of isopropanol and 59 g. of toluene. The mixture was heated to 80° C. and then 0.5 cc. of a 2 percent by weight solution of platinum in isopropanol was added, the platinum being in the form of chloroplatinic acid. The reaction was complete after about 15 minutes, the mixture having become a clear light brown color. The product was stripped to 130° C. at 10 mm. of mercury pressure to yield a product having a viscosity of 1013 cs., a specific gravity of 1.036, a refractive index of 1.4485 and the average structural formula

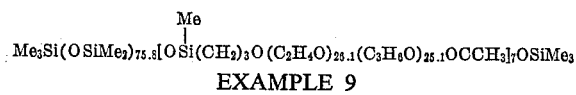

EXAMPLE 9

The procedure of Example 8 was repeated except that the reactants employed were $$Me_3Si(OSiMe_2)_{109.2}(OSiMeH)_{10}OSiMe_3$$

and $CH_2=CHCH_2O(C_2H_4O)_{24.3}(C_3H_6O)_{26.3}OCCH_3$ and the product was stripped to 125° C. at 1 mm. of pressure. The product obtained had a viscosity of 1612 cs., a specific gravity of 1.036, a refractive index of 1.4484 and the average structural formula

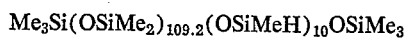

EXAMPLE 10

The procedure of Example 8 was repeated except that the siloxane reactant employed was $$Me_3Si(OSiMe_2)_{220.4}(OSiMeH)_{20}OSiMe_3$$

and the product was stripped to 133° C. at 13 mm. of pressure. The product obtained had a viscosity of 2061 cs., a specific gravity of 1.037, a refractive index of 1.4484 and the average structural formula

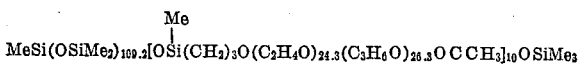

EXAMPLE 11

The procedure of Example 8 was repeated except that the siloxane reactant employed was $$Me_3Si(OSiMe_2)_{324}(OSiMeH)_{30}OSiMe_3$$

0.6 cc. of the platinum solution was employed, and the product was stripped to 130° at 8 mm. of pressure. The product obtained had a viscosity of 6269 cs., a specific gravity of 1.037, a refractive index of 1.4475 and the average structural formula

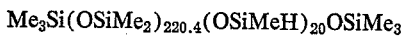

EXAMPLE 12

The products of Examples 8–11 were employed as surfactants for the preparation of polyurethane foams from the following formulation. All parts are on a weight basis. 100 parts of a 3500 molecular weight polyether triol, 15 parts of monofluorotrichloromethane, 4 parts of water, 0.15 part of triethylenediamine, 0.30 part of stannous octoate and 1.4 parts of the surfactant were thoroughly mixed and then 48.6 parts of toluene diisocyanate added thereto. The mixture was allowed to foam and in each case an excellent foam having fine open cells was obtained. These foams showed no pneumatic tendencies.

The above foams were also tested for breathability which is a measure of the number of open cells in the foam. "Breathability" is a numerical measure of the amount of air that can be drawn through a 1½″ x 1½″ x 1″ specimen of the foam at a pressure head of 1″ of water. The air is drawn through 1″ thickness of the foam, the air flow being parallel to the direction of foam rise. The breathability or air flow is reported in cubic feet of air per minute. The four foams prepared above using the surfactants of Examples 8–11 had the following breathabilities, respectively, 5.1, 5.4, 4.1 and 3.6 cubic feet of air per minute.

That which is claimed is:

1. A method of preparing a polyurethane foam which comprises mixing together a polymer selected from the group consisting of hydroxylated polyesters and hydroxylated polyethers, a catalyst, a blowing agent, an organic polyisocyanate and a copolymer selected from the group consisting of copolymers having the average structural formulae (1)    $R_aSi[(OSiMe_2)_o(OSiMeG)_dOSiMe_2G]_{4-a}$
(2)    $GMe_2Si(OSiMe_2)_n(OSiMeG)_bOSiMe_2G$
(3)    $Me_3Si(OSiMe_2)_n(OSiMeG)_cOSiMe_3$
(4)    $R_aSi[OSiMe_2)_o(OSiMeG)_cOSiMe_3]_{4-a}$ in which formulae R is a hydrocarbon radical free of aliphatic unsaturation and contains from 1 to 10 carbon atoms, Me is a methyl radical,
G is a radical of the structure $—D(OR'')_mA$ wherein
D is an alkylene radical,
R'' is composed of ethylene radicals and radicals selected from the group consisting of propylene and butylene radicals, the amount of ethylene radicals relative to the other alkylene radicals being such that the ratio of carbon atoms to oxygen atoms in the total OR'' blocks ranges from 2.3:1 to 2.8:1,
m has an average value from 25 to 100,
A is a radical selected from the group consisting of the OR', —OOCR' and

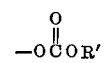

radicals wherein
R' is a radical free of aliphatic unsaturation selected from the group consisting of hydrocarbon and hydrocarbonoxy radicals, the A radical containing a total of less than eleven atoms,
a has an average value of from 0 to 1,
n has an average value of from 6 to 420,
d has an average value of from 0 to 30,
b has an average value of from 1 to 30, and
c has an average value of from 3 to 30, said copolymers containing at least 13 percent by weight $OSiMe_2$ units based on the weight of the copolymer, and thereafter allowing the mixture to foam.

2. The method of claim 1 wherein the copolymer has the Formula 1.

3. The method of claim 2 wherein $d$ is 0.

4. The method of claim 3 wherein D is a propylene radical and R'' is composed of ethylene and propylene radicals.

5. The method of claim 4 wherein the copolymer employed has the average formula

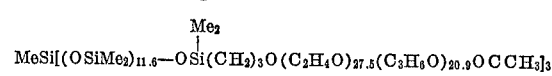

6. The method of claim 3 wherein the copolymer employed has the average formula

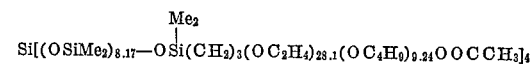

7. The method of claim 1 wherein the copolymer has the Formula 2.

8. The method of claim 7 wherein D is a propylene radical and R'' is composed of ethylene and propylene radicals.

9. The method of claim 8 wherein the copolymer employed has the average formula

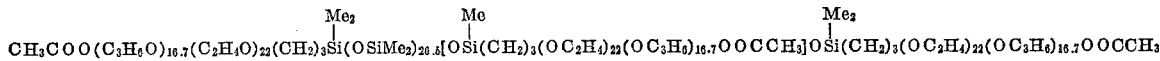

10. The method of claim 7 wherein the copolymer employed has the average formula

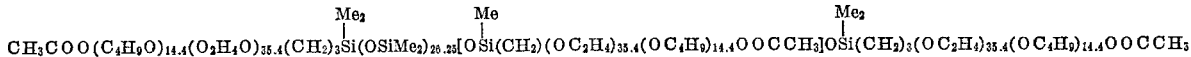

11. The method of claim 1 wherein the copolymer has the Formula 3.

12. The method of claim 11 wherein D is a propylene radical and R" is composed of ethylene and propylene radicals.

13. The method of claim 12 wherein the copolymer employed has the average formula

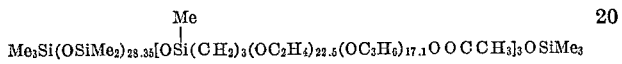

14. The method of claim 12 wherein the copolymer employed has the average formula

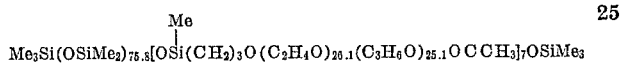

15. The method of claim 12 wherein the copolymer employed has the average formula

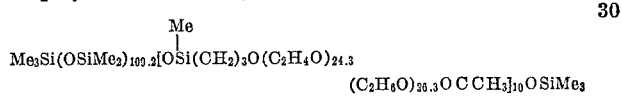

16. The method of claim 12 wherein the copolymer employed has the average formula

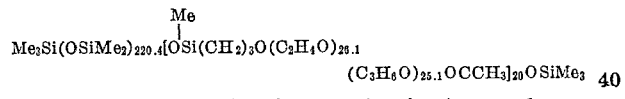

17. The method of claim 12 wherein the copolymer employed has the average formula

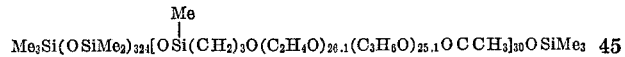

18. In a process for preparing a polyurethane foam, the improvement which comprises employing, as the surfactant, a siloxane glycol branched copolymer having the average structural formula

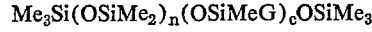

wherein

Me is a methyl radical,
G is a radical of the structure $-D(OR")_mA$ wherein
D is an alkylene radical,
R" is composed of ethylene radicals and radicals selected from the group consisting of propylene and butylene radicals, the amount of ethylene radicals relative to the other alkylene radicals being such that the ratio of carbon atoms to oxygen atoms in the total OR" blocks ranges from 2.3:1 to 2.8:1,
$m$ has an average value from 25 to 100,
A is a radical selected from the group consisting of the OR', —OOCR' and

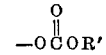

radicals wherein
R' is a radical free of aliphatic unsaturation selected from the group consisting of hydrocarbon and hydrocarbonoxy radicals, the A radical containing a total of less than eleven atoms,
$n$ has an average value of from 6 to 420, and
$c$ has an average value of from 3 to 30.

References Cited

UNITED STATES PATENTS

| | | | |
|---|---|---|---|
| 2,834,748 | 5/1958 | Bailey et al. | 260—42 |
| 2,839,558 | 6/1958 | Kirkpatrick et al. | 260—448.2 |
| 2,846,458 | 8/1958 | Haluska | 260—448.2 |
| 3,057,901 | 10/1962 | Plueddemann | 260—448.2 |
| 3,194,773 | 7/1965 | Hostettler | 260—2.5 |
| 3,272,762 | 10/1966 | Ibbotson et al. | 260—2.5 |

FOREIGN PATENTS

| | | |
|---|---|---|
| 955,916 | 1/1965 | Great Britain. |
| 1,015,611 | 1/1966 | Great Britain. |

DONALD E. CZAJA, *Primary Examiner.*
M. B. FEIN, *Assistant Examiner.*